United States Patent [19]

Kustka et al.

[11] 4,064,361
[45] Dec. 20, 1977

[54] CORRELATIVE TIMING RECOVERY IN DIGITAL DATA TRANSMISSION SYSTEMS

[75] Inventors: George John Kustka, Matawan; Kurt Hugo Mueller, Holmdel, both of N.J.

[73] Assignee: Bell Telephone Laboratories, Incorporated, Murray Hill, N.J.

[21] Appl. No.: 645,555

[22] Filed: Dec. 31, 1975

[51] Int. Cl.² .............................................. H04L 7/00
[52] U.S. Cl. ................................. 178/69.1; 329/145; 178/88
[58] Field of Search ................ 178/69.5 R, 88, 69.1; 325/320; 328/138, 151; 329/145; 235/150.3

[56] References Cited
U.S. PATENT DOCUMENTS

| 3,271,742 | 9/1966 | Rumble | 329/145 |
|---|---|---|---|
| 3,440,548 | 4/1969 | Saltzberg | 328/151 |
| 3,480,869 | 11/1969 | Hubbard | 329/145 |
| 3,656,064 | 4/1972 | Giles | 325/320 |
| 3,663,883 | 5/1972 | Olso | 178/69.5 R |
| 3,743,775 | 7/1973 | Hutchinson | 325/320 |
| 3,745,250 | 7/1973 | Gerst | 325/320 |
| 3,778,727 | 12/1973 | Williams | 325/320 |
| 3,878,468 | 4/1975 | Falconer | 178/88 |
| 3,883,729 | 5/1975 | de Cremiers | 178/69.5 R |
| 3,916,324 | 10/1975 | Shuda | 178/69.5 R |

*Primary Examiner*—Benedict V. Safourek
*Assistant Examiner*—Michael A. Masinick
*Attorney, Agent, or Firm*—Joseph P. Kearns

[57] ABSTRACT

A sample timing recovery arrangement for synchronous amplitude and phase modulated digital data transmission systems correlates present and delayed samples of received digital data signals to obtain a spectral line at the sampling rate using digital techniques. Conventional methods of timing recovery generally perform analog operations on the envelope of a received data signal.

11 Claims, 3 Drawing Figures

CORRELATIVE TIMING RECOVERY IN DIGITAL DATA TRANSMISSION SYSTEMS

FIELD OF THE INVENTION

This invention relates to sample timing recovery in synchronous digital data receivers.

BACKGROUND OF THE INVENTION

In synchronous digital data transmission systems it is necessary to sample received signals once during each signaling interval at uniformly spaced instants of time. Data decisions are made at sampling times. Overall error performance of a synchronous data transmission system depends critically on the choice of the sampling instant particularly when multilevel encoding is employed.

The sampling frequency used in a data receiver can be obtained generally from either the received data signal itself or from auxiliary transmitted frequencies, such as pilot tones. The sampling phase, however, should be obtained from the received signal alone since it has been subjected to phase distortion in traversing the transmission medium. Typically, both sampling frequency and phase have been extracted from the analog received wave by differentiation and rectification of its envelope and use of the resultant zero-crossing pulses to drive a tuned circuit or a phase locked oscillator loop. Diffferentiation and rectification can be broadly classified as nonlinear processes by means of which a discrete spectral line at the sampling frequency can be generated.

It is an object of this invention to improve upon and simplify timing recovery in digital data transmission systems which employ nonlinear networks to generate a discrete spectral line.

It is a further object of this invention to generate a timing recovery wave for digital data transmission systems without reference to any observation of, or operation on, the analog envelope of the received signal wave.

It is another object of this invention to recover an accurate timing wave in digital data systems by comparing successive periods of the received signal wave.

It is still another object of this invention to recover the timing wave from either a baseband or a modulated passband data signal.

It is yet another object of this invention to recover the timing wave for a modulated passband signal without interference from double-frequency signal components.

SUMMARY OF THE INVENTION

According to this invention a sample timing recovery wave is obtained from a received digital data signal by multiplying this signal by a delayed version of itself, and narrow-band filtering the resultant product. The arrangement implements a correlative timing recovery principle.

In one preferred embodiment of this invention, the received digital data signal is hardlimited to remove amplitude variations and emphasize instantaneous polarity. The resulting polarity signal is then multiplied by a digitally delayed version of itself. Hardlimiting the incoming signal wave reduces it to binary values which can readily be correlated by an elementary exclusive-OR gate. The delay medium is readily implemented digitally, e.g., as a multistage shift register. The principle of operation is applicable to both baseband and passband received signals.

Accordingly, apparatus for generating a sample timing recovery wave for a synchronous data transmission system comprises a hard limiter, a delay medium, a correlator and a narrow-band filter.

This invention is advantageously characterized by the simplicity and economy of its implementation which employs readily available components in a form susceptible to realization by large scale integration techniques.

BRIEF DESCRIPTION OF THE DRAWING

The objects and advantages of this invention will become more apparent from a consideration of the following detailed description and the drawing in which.

DESCRIPTION OF THE ILLUSTRATIVE EMBODIMENTS

Figure 1:
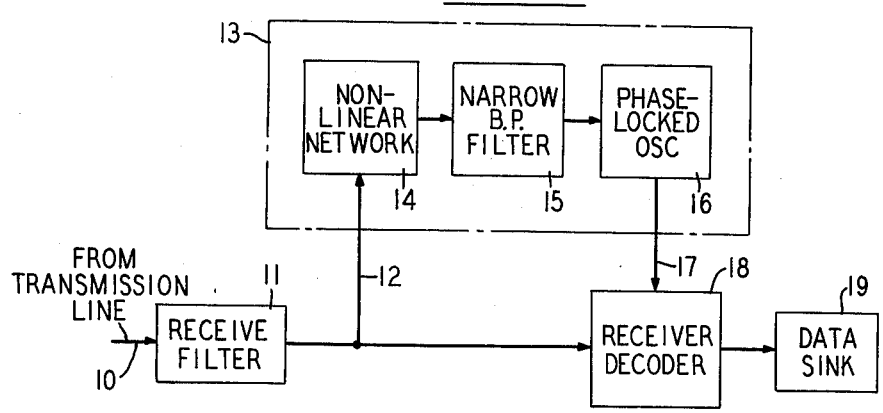
FIG. 1 is a block diagram of a representative class of prior art sample timing recovery arrangements for synchronous digital data transmission systems.

FIG. 1 is representative of a known class of sample timing recovery arrangements which extract timing information from a spectral line generated at the symbol frequency through the purposeful introduction of nonlinearities. Such nonlinear processing is required because the spectrum of a non-redundant data signal is continuous and therefore does not contain any spectral lines useful for synchronization purposes.

FIG. 1 broadly illustrates a receiver for a synchronous data transmission system comprising receiving filter 11 for constraining the received signal to a bandwidth compatible with the capabilities of the overall receiver, receiver decoder 18 for extracting baseband data from the modulated received carrier wave and a data sink 19 for interpreting the data. The timing recovery subsystem associated with the receiver is confined within broken-line box 13 connected between the output of receiver filter 11 at lead 12 and a timing input at lead 17 to receiver decoder 18. Timing recovery subsystem 13 broadly comprises nonlinear network 14 operating on the filtered received signal, narrow bandpass filter 15 and phase-locked oscillator 16 having a nominal frequency close to the sampling frequency. Phase-locked oscillator 16 can also be a resonant circuit with a high-Q.

Nonlinear network 14 typically comprises a squaring circuit opening on the received signal producing among others a periodic term related to the symbol interval T. The latter component is extracted by narrow bandpass filter 15. Once extracted, the reciprocal of the 1/T periodicity component locks the phase of oscillator 16 to deliver pulses at the correct sampling instants over lead 17 to decoder 18. Error-free data decisions are thus made possible. Similar results are obtained when a full wave rectifier is used instead of a squaring circuit.

Phase-locked oscillator 16 can be implemented in digital form using a crystal controlled countdown circuit whose output wave is at the nominal timing frequency and whose phase is updated according to a comparison of its zero crossings with those of the output of narrow bandpass filter 15. The time constant of the phase-locked oscillator can be chosen to provide good phase jitter suppression.

The nonlinear squaring and rectifying schemes of the prior art for sample timing recovery can be interpreted as special cases of a more general synthesis expressed as $$s(t) = x(t) x(t - 2\tau), \quad (1)$$

where $s(t)$ = resultant signal containing a periodic component at the timing frequency,
$x(t)$ = received signal,
$x(t - 2\tau)$ = received signal delayed by a fixed amount $2\tau$.

Equation (1) represents the product of the present received data signal by a delayed replica of itself.

Figure 2:
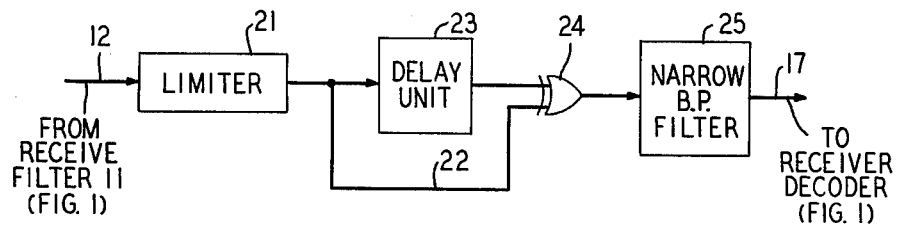
FIG. 2 is a block diagram of a sample timing recovery circuit for either a baseboard or a passband data transmission system according to this invention.

FIG. 2 is a block diagram of a subsystem for implementing equation (1) in combination with a limiter circuit comprising incoming line 12, limiter 21, delay unit 23, bypass line 22, multiplier 24, narrow bandpass filter 25 and output lead 17.

Limiter 21 is of the polarity discriminator type and produces at its output a binary waveform with the same polarity and zero crossings as the input waveform. This binary waveform is delayed in delay unit 23, which consists of a serial memory (e.g. a shift register) which is sampled at a rate substantially higher than that indicated by the zero crossing intervals of the intput signal in order to yield an accurate delayed replica of its input. This delayed binary signal is applied to one input terminal of multiplier 24, while the undelayed binary signal is, via bypass line 22, applied to the other input terminal of multiplier 24. Because the input signals are binary, multiplier 24 can be a simple exclusive-OR gate. The multiplier output is entered into narrow bandpass filter 25. Output 17 of filter 25 is connected to the receiver decoder for sampling purposes as in FIG. 1.

For analytic purposes delay unit 23 can be envisioned as subjecting the received signal to positive and negative delays $\tau$. Then equation (1) can be rewritten in an equivalent form as $$s(t) = x(t + \tau) x(t - \tau) \quad (2)$$

The effect of the hard limiter 21 is omitted from the analysis, but it has been observed that its inclusion will yield a binary recovery system with essentially identical properties, but with the added benefit that the recovered timing waveform amplitude is independent of the level of the received signal.

Let it be assumed that the received signal is a baseband pulse amplitude-modulated (PAM) signal of the form $$x(t) = \sum_n a_n h(t - nT), \quad (3)$$

where $a_n$ = random equiprobable binary data symbols with values of $\pm 1$ units,
$h(t)$ = impulse response characteristic of the transmission channel,
$n$ = time index, and
$T$ = symbol interval.

The spectrum of $x(t)$ is continuous and contains no discrete spectral lines. Substitution of equation (3) into equation (2) and carrying out the indicated multiplication yields $$s(t) = \sum_m \sum_n a_m a_n h(t - \tau - mT) h(t + \tau - nT), \quad (4)$$

where $m$ = an additional time index to distinguish simultaneous discrete inputs to the multiplier. A periodic component is created in an expansion of equation (4) for the $n = m$ terms, thus yielding an expected value $$p(t) = \sum_n h(t - \tau - nT) h(t + \tau - nT). \quad (5)$$

Let $$g(t) = h(t - \tau) h(t + \tau). \quad (6)$$

Then $$p(t) = \sum_n g(t - nT). \quad (7)$$

Equation (7) is the representation of a periodic waveform with period T. By continued analysis, it can be shown that the phase of its fundamental timing component corresponds, for a wide range of practical channels, to the desired sampling phase.

A passband data signal can be analyzed to produce results similar to those of the baseband example.

Let a generalized passband data signal be orthogonally represented by $$q(t) = x(t) \cos \omega_c t - y(t) \sin \omega_c t, \quad (8)$$

where $x(t)$ = in-phase baseband component,
$y(t)$ = quadrature-phase baseband component, and
$\omega_c$ = radian carrier frequency.

The baseband components $x(t)$ and $y(t)$ can characterize any linear modulation system including double sideband (DSB), quadrature amplitude modulation (QAM), phase modulation (PM), combined amplitude and phase modulation (AM-PM), vestigial sideband (VSB) and single sideband (SSB).

By multiplying the signal represented by equation (8) by a replica of itself delayed by $2\omega$ an equation analogous to equation (2) can be written for the passband example. Thus, $$s(t) = q(t - \omega) q(t + \omega). \quad (9)$$

Inserting (8) into (9) yields $$s(t) = \cos(2\omega_c \tau) \{x(t - \tau) x(t + \tau) + y(t - \tau) y(t + \tau)\} - \sin(2\omega_c \tau) \{x(t - \tau) y(t + \tau) + y(t - \tau) x(t + \tau)\} + \text{double frequency terms.} \quad (10)$$

By selecting the delay $2\tau$ according to $$2\tau = k\pi/\omega_c, \ k = 0, 1, 2, \ldots \quad (11)$$

we have $$s(t) = (-1)^k \{x(t - \tau) x(t - \tau) + y(t + \tau) y(t + \tau)\} + \text{double frequency terms.} \quad (12)$$

Apart from the sign term $(-1)^k$ and the double frequency terms centered around $2\omega_c$, this contains the same expression as does equation (2), in terms of both in-phase and quadrature-phase baseband components. Therefore, the same periodic timing waveform can be extracted as previously shown for the correlation operation on the unmodulated basebad signal itself. If $k$ is odd, the phase of the recovered timing waveform is inverted, but this can be compensated by simply re-inverting that waveform. Unfortunately, in some systems, the double frequency terms may not be entirely located out of range of the narrow band timing recovery filter. The resulting contamination will yield increased timing jitter and is undesirable. However, if the incoming received signal is phase split into quadrature (orthogonal) components, e.g., by taking the Hilbert transform, and if further the resultant quadrature components are independently correlated and then recombined, double frequency components cancel out, the separation problem is avoided, and the system performs as in the baseband case The phase split signal is represented by $$s(t) = q(t-\tau) q(t+\tau) + \hat{q}(t-\tau) \hat{q}(t+\tau), \quad (13)$$

where $\hat{q}(t)$ = the quadrature signal component (or Hilbert transform) $p1 = x(t) \sin \omega_c t + y(t) \cos \omega_c t$. (14)

Performing the indicated operations results in an in-phase and quadrature-phase term, $$s(t) = \cos(2\omega_c \tau) [x(t-\tau) x(t+\tau) + y(t-\tau) y(t+\tau)] - \sin(2\omega_c \tau) [x(t-\tau) y(t+\tau) - y(t-\tau) x(t+\tau)] \quad (15)$$

By again selecting the delay $2\tau$ as $K\pi/\omega_c$, we obtain $$s(t) = x(t-\tau) x(t+\tau) + y(t-\tau) y(t+\tau). \quad (16)$$

Equation (16) is completely analogous to equation (2) from the baseband example and includes equation (2) when the $y$ components are absent.

Let the $x$ and $y$ components of equation (16) be represented by data symbols $a_n$ and $b_n$ in the respective orthogonal channels. Let the in-phase and quadrature-phase impulse responses be $h(t)$ and $f(t)$. Then $$x(t) = \sum_m a_m h(t - mT) - b_m f(t - mT), \text{ and} \quad (17)$$

$$y(t) = \sum_m a_m f(t - mT) + b_m h(t - mT). \quad (18)$$

Combining equations (15)–(18) yields an equation similar in form to equation (4).

$$s(t) = \sum_m \sum_n (a_m a_n + b_m b_n) [h(t - \tau - mT) h(t + \tau - nT) + f(t - \tau - mT) f(t + \tau - nT)] \quad (19)$$
+ crosschannel interference terms.

The double summation contains timing information in its $m = n$ term and its expected value becomes $$p(t) = \sum_n [h(t - \tau - nT) h(t + \tau - nT) + f(t - \tau - nT) f(t + \tau - nT)]. \quad (20)$$

Except for the quadrature interference, equation (20) is the same as equation (5) for the baseband case and equates with a waveform periodic in T. The crosschannel interference terms in (19) do not contain timing information but will introduce additional jitter. The interfering products of quadrature impulse terms in (20) will also yield periodicity in T; however, they will introduce waveform distortion which can result in sampling phase offset. For an ideal channel, $f(t) = 0$, and both of these degradations do not exist. In that case the periodic component $p(t)$ resulting from passband signal processing does not differ from that obtained from baseband inputs.

The previous procedure applies not only to QAM systems with independent symbols $a_n$ and $b_n$ in the respective orthogonal channels, but also to phase modulation (PM) systems where $$a_n = \cos \theta_n, \text{ and } b_n = \sin \theta_n, \quad (21)$$

and thus $$a_m a_n + b_m b_n = \cos(\theta_n - \theta_m), \text{ and} \quad (22)$$

$$a_m b_n - b_m a_n = \sin(\theta_n - \theta_m). \quad (23)$$

Equations (22) and (23) can be directly substituted in equation (19) without any change in result. Therefore, equation (20) defines the expectation $p(t)$ for both QAM and PM data transmission systems.

Figure 3:
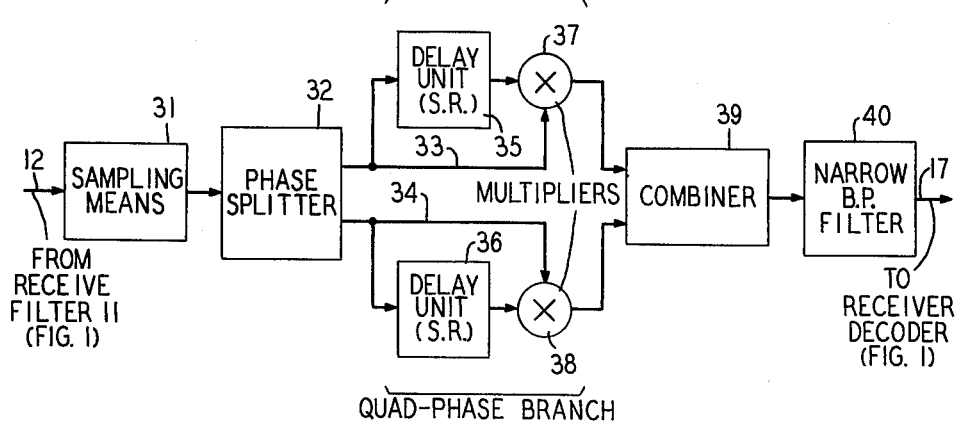
FIG. 3 is a block diagram of a sample timing recovery circuit for a passband data transmission system according to this invention.

FIG. 3 illustrates the general passband embodiment of this invention as represented by equation (8) through (23). The passband timing recovery system of FIG. 3 comprises sampling means 31, phase splitter 32, delay elements 35 and 36, multipliers 37 and 38, combiner 39 and narrow bandpass filter 40. For synchronous data transmission systems containing quadrature (orthogonal) components whether QAM or PM, the arrangement of FIG. 3 is directly substitutable for the arrangement of FIG. 2, but without the limiter, between input line 12 and output line 17 as a nonlinear processor for deriving timing information.

Sampling means 31 samples received data signals on line 12 at a rate substantially higher than the frequency of the carrier wave employed.

Phase splitters 32 splits the input signal into two orthogonal components with a 90° relative phase shift as described by equations (8) and (14), the respective in-phase and quadrature-phase components of the received signal. Delay units 35 and 36 provide the required delay $2\tau$ for respective in-phase and quadrature-phase components of the received signal. The delay $2\tau$ in each delay unit is selected to be a multiple of half the carrier period, according to equation (11). It is important to realize that this delay is determined by the modulating carrier frequency, and not by the sampling frequency.

Multipliers 37 and 38, which correlate the direct and delayed samples of the phase-split received signals, are product-taking linear circuits or digital multipliers, depending on whether the system is realized in analog or digital form. Likewise, delay units 35 and 36 can be realized via analog or digital means. Combiner 39 is a linear adder in either analog or digital realization. In the case of a digital system, analog-to-digital conversion is either performed ahead of phase splitter 32, or it can be performed at both outputs of phase splitter 32. In the first case, the phase splitter circuit would be digitally implemented, in the second case implementation would be analog. Narrow bandpass filter 40 removes random frequency components and filters out the spectral line at the sampling frequency from the output of combiner 19. Narrow bandpass filter 40 in FIG. 3 is the same in function as element 25 in FIG. 2.

It has been found that when the only distortion in the received signal is due to amplitude variations the resulting phase is optimum, i.e., it coincides with the maximum eye pattern opening. In the presence of severe phase distortion, however, an error up to one-third the baud interval T can occur. This same offset error is found also in timing recovery arrangements using the squaring process. In conjunction with an adaptive equalizer in the overall receiver system this offset is largely removed. It has been further found that the preferred delay time $2\tau$ in a passband data system should be on the order of one-half to one symbol interval T and the factor $k$ in (11) should be chosen accordingly. In a typical four-phase PM data system using a baud rate of 1200 (T = 1/1200) and a carrier frequency of 1800 Hz, either $k = 3$ and $2\tau = T = 1/1200$ second, or $k = 2$ and $2\tau = 2T/3$.

While this invention has been described in terms of specific illustrative embodiments, it is clear to those skilled in the art to which it relates that these embodiments are susceptible of a wide range of modification within the spirit and scope of the appended claims.

What is claimed is:

1. A timing recovery arrangement for received synchronous digital data signals comprising:
    means for delaying receiving digital data signals to produce delayed replicas thereof,
    means for correlating undelayed received digital signals with delayed replicas thereof from said delaying means to produce a correlation signal, and
    means for bandpass filtering from said correlation signal a periodic component representative of baud sample timing in receiving signal.

2. The timing recovery arrangement of claim 1 in which said delaying means comprises at least a fixed delay device whose delay amount is an integral multiple of the nominal synchronous baud period.

3. The timing recovery arrangement of claim 1 in which said received synchronous digital data signals are modulated on a sinusoidal carrier wave of fixed period and said delaying means comprises a fixed delay device whose delay amount is an integral multiple of half the period of said modulated carrier wave.

4. A timing recovery arrangement for received synchronous digital data signals modulating a sinusoidal carrier wave of fixed period comprising:
    means for hard-limiting said received data signals to preserve zero-crossing transition instants only,
    means for delaying signals from said hard-limiting means by an integral multiple of half the period of said carrier wave,
    means for correlating undelayed signals from said hard-limiting means and delayed signals from said delaying means to form an output wave containing frequency components at the desired timing rate; and
    narrowband filter means for separating the desired timing rate from all other frequency components in the output wave from said correlating means.

5. The timing recovery arrangement of claim 4 in which said delaying means is a multistage shift register whose advancememt rate is a multiple of the synchronous baud rate.

6. The timing recovery arrangement of claim 4 in which said correlating means is an exclusive-OR gate.

7. A timing recovery arrangement for received synchronous digital data signals modulating a sinusoidal carrier wave of fixed frequency and period comprising:
    means for hard limiting said received data signals to preserve zero-crossing transistion instants only,
    phase splitting means operating on the output of said hard limiting means for separating orthogonally related in-phase and quadrature-phase components therefrom,
    means for delaying separately the in-phase and quadrature-phase components from said phase splitting means by integral multiples of half the period of said carrier wave,
    means for correlating separately in-phase and quadrature-phase delayed and undelayed signals from said phase splitting means,
    means for combining the separately correlated in-phase and quadrature-phase signals into a composite wave free of seond harmonic components, and
    narrowband filter means for separating the desired timing rate from all other frequency components in the composite wave from said combining means.

8. In a receiver for digital data signals linearly modulated onto a carrier wave of fixed frequency, a timing recovery arrangement comprising:
    a limiter for emphasizing polarity only of received data signals;
    a delay network operating on signals from said limiter and providing a delay amount substantially equal to an integral multiple of half the reciprocal of the frequency of said carrier wave;
    a multiplier for taking the products of undelayed signals applied to, and delayed signals emanating from, said delay network; and
    a narrowband filter for separating a timing wave containing a desired sampling frequency from undesired frequencies in the output of said multiplier.

9. The receiver defined in claim 8 in which said limiter is a zero-threshold polarity slicer, said delay network is a binary serial memory, said multiplier is an exclusive-OR gate.

10. In a receiver for digital data signals modulatd onto a carrier wave of fixed frequency, a timing recovery arrangement comprising:
    means for sampling received data signals at a rate substantially higher than the frequency of said carrier wave,
    phase shifting network for transforming received data signals operated on by said sampling means into in-phase and quadrature-phase components;
    a delay network operating on each of the in-phase and quadrature-phase components from said phase shifting network for providing a delay substantially equal to an integral multiple of the reciprocal of twice the frequency of said carrier wave;
    a multiplier for taking the products of the respective input and output signals of each of said delay networks;
    a combiner for products from each of the in-phase and quadrature-phase multipliers; and
    a narrow bandpass filter for extracting the desired sample timing frequency from the output of said combiner.

11. In a receiver for digital data signals linearly modulated onto a carrier wave, a timing recovery system comprising:
    means for sampling received data signals at a rate substantially higher than the frequency of said carrier wave;
    a serial digital memory for storing and delaying successive outputs of said sampling means, the delay introduced between inputs and outputs of said memory being substantially equal to an integral multiple of twice the reciprocal of the frequency of said carrier wave;
    multiplying means for forming successive products of inputs and outputs of said memory; and
    filtering means for extracting a timing waveform containing the desired timing frequency from the output of said multiplying means.

* * * * *